United States Patent Office 2,765,940
Patented Oct. 9, 1956

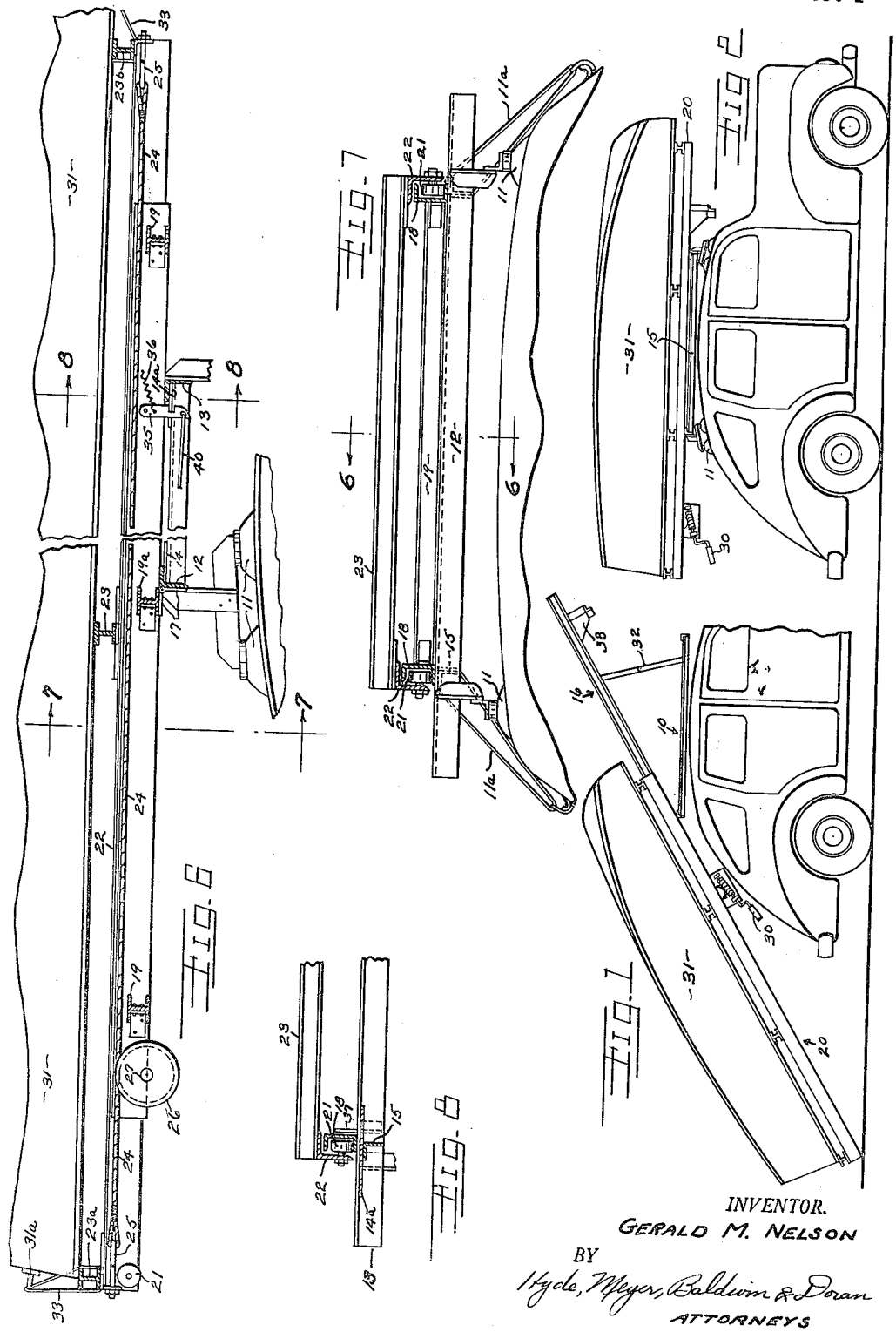

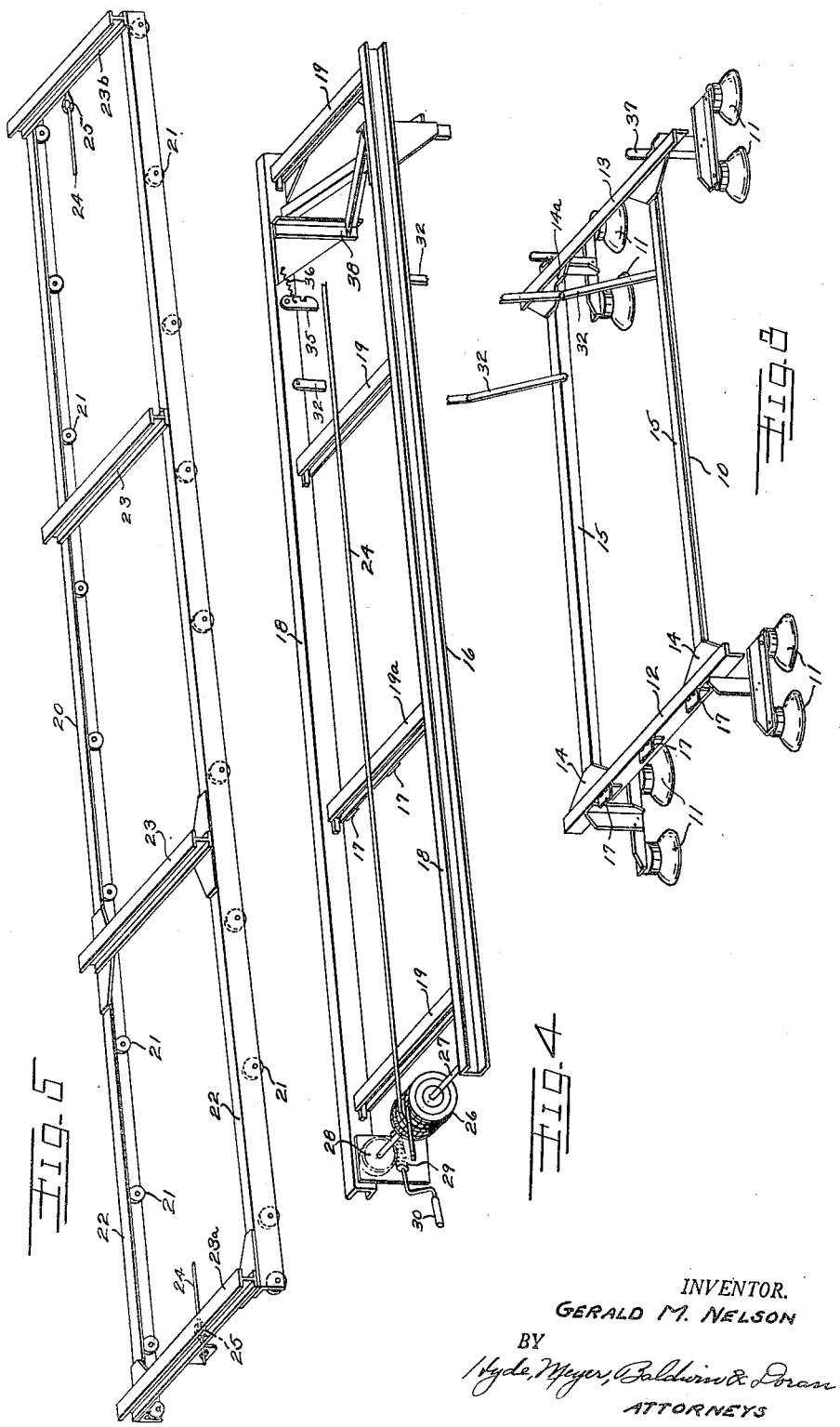

2,765,940

LOAD HANDLING APPARATUS

Gerald M. Nelson, Cleveland, Ohio, assignor of one-half to Elizabeth S. Nelson

Application April 14, 1953, Serial No. 348,781

1 Claim. (Cl. 214—450)

This invention relates to load handling apparatus adapted to be mounted on a vehicle.

An object of the present invention is to provide load handling apparatus which is readily mounted on a vehicle.

Another object of the present invention is to provide load handling apparatus which requires a minimum of effort to hoist bulky objects on and off a vehicle.

Still another object of the present invention is to provide apparatus for handling an elongated object such as a boat, by a tiltable frame having a carriage slidably mounted to tilt to a generally horizontal position when the object is being transported or to assume an inclined position when the object is being lowered to or raised from the ground.

Other objects and advantages of my invention will be apparent from the drawings and description and the essential features will be set forth in the appended claim.

In the drawings,

Fig. 1 is a side elevational view of a vehicle with my improved load handling apparatus mounted on the roof thereof and with the load in position ready to be hoisted upon the vehicle;

Fig. 2 is a side elevational view similar to Fig. 1, but showing the load in transporting position, Fig. 3 is a perspective view of the rigid member which is secured to the vehicle, Fig. 4 is a perspective view of the intermediate member which is hinged to the rigid member, Fig. 5 is a perspective view of the sliding carriage which is carried by the intermediate member, Fig. 6 is a longitudinal sectional view on the line 6—6 of Fig. 7, Fig. 7 is a transverse sectional view on the line 7—7 of Fig. 6; while, Fig. 8 is a sectional view on the line 8—8 of Fig. 6.

For simplicity of description I will describe my invention as being used to transport a boat, but it will be obvious that the load may be any elongated object or may be a number of assembled smaller objects.

As best shown in Fig. 3, I provide a rigid or base member 10 mounted on the roof of a vehicle (Figs. 1 and 3) by means of suction cups 11 or any other suitable means. I may also provide straps 11a to engage the drip molding of the vehicle.

The rigid member 10 consists of two transversely extending end angles 12, 13, to which are connected by means of gusset plates 14, as by welding or bolting, two longitudinally extending side angles 15.

An intermediate member 16 (Fig. 4) is mounted on a pivotal axis on the rigid member 10 by means of hinges 17, secured between the transverse angle 12 of the rigid member and cross beam 19a of member 16.

The member 16 consists of two longitudinally extending side channel members 18 having the flanges of said channel members extending outwardly. The channel members 18 being spaced and rigidly fixed in parallel relationship to each other by cross members 19, 19a. The hinges 17 are carried by the cross member 19a, a portion of the hinge being shown in Fig. 4.

The sliding carriage 20 (Fig. 5) is adapted to be carried by the intermediate member 16 by means of rollers 21 rotatably mounted on the carriage and running in the channel members 18. The rollers 21 are mounted upon the depending legs of the longitudinally extending side angles 22, which are spaced and rigidly fixed in parallel relationship to each other by cross members 22, 23a, and 23b.

The carriage 20 is capable of being moved in a fore-and-aft direction relative to the vehicle (Fig. 1) by means of a cable 24 which is secured to the rear cross member 23a of carriage 20 by an eye bolt 25. The cable 24 is then passed around a spirally grooved drum 26 with two or three turns, to insure a frictional drive, and is then carried forward over the cross members 19, 19a of the intermediate member 16 and beneath the cross members 23 of carriage 20, as best shown in Fig. 6, and is then secured to cross member 23b by another eye bolt 25.

The drum 26 (Fig. 4) is mounted on a shaft 27, and shaft 27 is carried by the channel members 18. A worm wheel 28 is fixed to shaft 27 adapted to be rotated either clockwise or counterclockwise by worm 29 and crank 30.

It will now be apparent that as the drum 26 is rotated counterclockwise (Fig. 4) the cable 24 is taken up from the front of the carriage and payed off to the rear, thereby pulling the carriage to the rear. When the drum 26 is rotated clockwise the reverse movement takes place.

It will also be noted that the worm wheel 28 and worm 29 act as a lock to prevent the carriage from accidentally moving rearwardly.

With the boat in position as shown in Fig. 2 the apparatus is operated to bring the boat to the position shown in Fig. 1, as follows:

The drum 26 is rotated counterclockwise (Fig. 4) by crank 30, worm 29, and worm wheel 28 until the sliding carriage, to which the boat is secured, by any suitable means, is pulled rearwardly enough to cause it to overbalance and pivot counterclockwise about the hinges 17.

The intermediate member 16, carriage 20, and the boat are prevented from tilting too far by the stay braces 32 which are pinned to the channel members 18 of the intermediate member 16 and to the longitudinally extending members 15 of the rigid member 10.

The drum is then further rotated until the rear portion of the sliding carriage 20 rests on the ground. The boat 31 may then be removed and the unloaded carriage returned to its transporting position by means of the crank 30.

To again load the boat on the vehicle, the carriage is lowered, the boat is placed on the carriage and secured to it by straps 32 passing around cross members 23a and 23b and suitable lugs 31a on the boat. The crank is then rotated to bring the carriage to the position of Fig. 2.

I provide a latch 35 to prevent the carriage 20 and the intermediate member 16 from pivoting about the hinge 17 when the boat is being transported. The latch 35 is biased by spring 36 to engage one of the gusset plates 14 of the rigid member 10, the gusset plate being notched out at 14a for the purpose.

The latch may be released by the cable 40 fixed to the latch 35 and extending rearwardly adjacent the crank 30.

I also provide vertical members 37 (Figs. 5 and 8) fixed to angle 13 of rigid member 10. The members 37 extend upwardly between and substantially in engagement with the channel members 18 of the intermediate member 16 to prevent lateral movement of carriage 20 and member 16.

The bracing 38 at the forward end of the intermediate member 16 prevents undue twisting.

Although I have described my invention as being mounted on the roof of a vehicle, it will be obvious that it may be mounted on the bed of a truck, by bolts if necessary, instead of the suction cups 11.

By suitable choice of drum 26 and its operating mechanism, a fairly heavy boat may be loaded and unloaded by a person of less than average strength.

What I claim is:

In combination, a vehicle, a rigid member adapted to be mounted on said vehicle, an intermediate member pivotally mounted on said rigid member along a pivotal axis, a carriage slidably mounted on said intermediate member for movement transversely of said pivotal axis, means for moving said carriage relative to said intermediate member, to move the center of gravity of said carriage and said intermediate member transversely of said pivotal axis to produce turning movement of said carriage and said intermediate member about said pivotal axis, said intermediate member comprising two parallel frame members extending transversely of said pivotal axis, said parallel frame members being of channel-shape cross section having the flanges thereof turned outwardly, said carriage comprising depending parallel side members extending transversely of said pivotal axis, rollers rotatably mounted on said depending side members and adapted to engage said first named parallel members, within said channel shape sections, said moving means comprising a drum mounted on said intermediate member, a cable having its ends fixed fore and aft to said carriage and having an intermediate portion passing around said drum, and rotating means for said drum for moving said carriage relative to said intermediate member, latch means mounted on said intermediate member adapted to engage said rigid member to prevent turning movement of said carriage and said intermediate member about said pivotal axis, and means mounted on said rigid member for preventing lateral movement of said carriage and said intermediate member when said carriage and said intermediate member are in transporting position.

References Cited in the file of this patent

UNITED STATES PATENTS

| | | |
|---|---|---|
| 2,091,069 | Girl | Aug. 24, 1937 |
| 2,247,128 | Levey | June 24, 1941 |
| 2,318,971 | Roumage et al. | May 11, 1943 |
| 2,446,092 | Lait | July 27, 1948 |
| 2,551,351 | Swenson | May 1, 1951 |
| 2,584,163 | Squires | Feb. 5, 1952 |
| 2,588,001 | Holland | Mar. 4, 1952 |
| 2,600,082 | Sumner | June 10, 1952 |
| 2,621,814 | Lisots | Dec. 16, 1952 |
| 2,624,497 | Newman | Jan. 6, 1953 |